March 26, 1963     A. ARMEN ETAL     3,083,178
GRAFT COPOLYMERS OF ACRYLATE AND METHACRYLATE MONOESTERS OF
POLYGLYCOLS ON N-VINYL-3-MORPHOLINONE POLYMER
SUBSTRATES, IMPROVED ACRYLONITRILE POLYMER
COMPOSITIONS OBTAINABLE THEREWITH, AND
METHOD OF PREPARATION
Filed Oct. 22, 1959

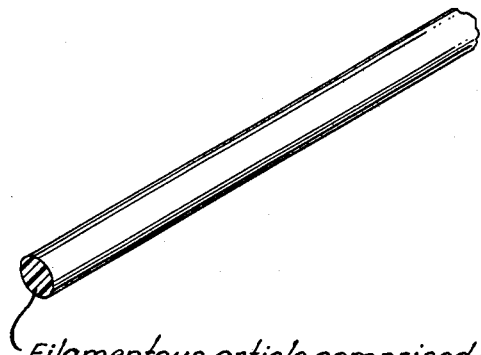

Filamentous article comprised of an
acrylonitrile polymer having a graft
copolymer comprising a monomeric
acrylate ester of a polyglycol graft
copolymerized upon an N-vinyl-3-
morpholinone polymer substrate
incorporated therein.

INVENTORS.
Ardy Armen
Stanley A. Murdock
BY
THEIR ATTORNEY

United States Patent Office 3,083,178  
Patented Mar. 26, 1963

3,083,178  
GRAFT COPOLYMERS OF ACRYLATE AND METHACRYLATE MONOESTERS OF POLYGLYCOLS ON N-VINYL-3-MORPHOLINONE POLYMER SUBSTRATES, IMPROVED ACRYLONITRILE POLYMER COMPOSITIONS OBTAINABLE THEREWITH, AND METHOD OF PREPARATION  
Ardy Armen, Denbigh, Va., and Stanley A. Murdock, Rancho Cordova, Calif., assignors to The Dow Chemical Company, Midland, Mich., a corporation of Delaware  
Filed Oct. 22, 1959, Ser. No. 847,983  
19 Claims. (Cl. 260—45.5)

The present invention resides in the general field of organic chemistry and contributes specifically to the polymer art, especially with respect to various polymer compositions, including, in particular, graft copolymers, and fiber-forming polymer blends obtainable therewith. It is particularly concerned with various graft copolymer products on N-vinyl-3-morpholinone polymer substrates of certain monofunctional monomeric acrylate and methacrylate monoesters of polyglycols that have non-reactive terminal end groups, which graft copolymer products have especial utility as dye-receptive and/or antistatic and/or stabilizing additaments for acrylonitrile polymer compositions, which, advantageously, may be of the fiber-forming variety.

The invention is also concerned with the compositions that may be obtained by blending the indicated and hereinafter more fully delineated graft copolymer products with acrylonitrile polymers, as well as with shaped articles which have been fabricated from such polymer blended compositions and which, as a consequence, have significantly enhanced properties and characteristics as regards improvements in and relating to either enhanced dye-receptivity, minimized inherent propensity to accumulate electrostatic charges, natural stability to various deteriorating influences, including stability against becoming deleteriously influenced and degraded upon exposure to heat at elevated temperatures and to light, or to more than one or all of such particulars.

There are known to exist various unsaturated mono- and diesters and mixtures thereof of various glycols and polyglycols. These monomers may be converted to polymeric products by taking advantage of their unsaturated structure. Such polymeric materials, however, may not be suitable for certain purposes. Furthermore, many of them may not be substantantive to or adherescent upon various hydrophobic synthetic textile fibers and the like articles. Hence, they generally may not be well adapted for utilization in combination with such articles.

It would be an advantage to provide new water soluble and hydrophilic graft copolymer products that, among other uses, might be employed with great benefit as dye-receptive and/or antistatic and/or stabilizing additaments or agents for certain hydrophobic synthetic textile fibers and the like, particularly acrylonitrile polymer fibers.

Therefore, one object of the present invention is to provide, as new compositions of matter, water-soluble graft copolymer compositions that contain graft copolymerized on an N-vinyl-3-morpholinone polymer substrate and as essential ingredients of the constitution, the characterizing group or unit:

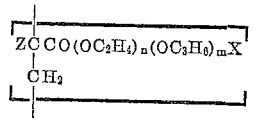

wherein Z is selected from the group consisting of hydrogen and methyl; X is selected from the group consisting of halogens of atomic number 17 to 53 (i.e., chlorine, bromine and iodine), alkoxy radicals containing from 1 to 2 carbon atoms (i.e., —OCH$_3$ and —OC$_2$H$_5$) and alkyl sulfide radicals containing from 1 to 2 carbon atoms (i.e., —SCH$_3$ and —SC$_2$H$_5$); $n$ is a number having an average value of from 5 to 100; and $m$ is a number that includes zero and has an average value that may be as large as 10.

Thus, a specific objective of the invention is to provide various graft copolymer products from water-soluble monoethylenically unsaturated monomers of the structure:

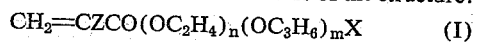

wherein all the generic terms have the above indicated meanings and values.

Thus, the particular purpose of the invention is to provide graft copolymers of the above indicated monomers of the Formula I upon various trunk or base substrate N-vinyl-3-morpholinone polymers, particularly poly-N-vinyl-3-morpholinone, which is also known as being poly-4-vinyl-3-morpholinone.

Yet another related objective of the present invention is to provide graft copolymers of a preformed N-vinyl-3-morpholinone polymer trunk or base, particularly poly-N-vinyl-3-morpholinone, upon which there is graft copolymerized mixtures of monomers consisting of (a) monofunctional acrylate or methacrylate monoesters of polyglycols that have non-reactive terminal and groups of the Formula I and (b) at least one member of the monomeric alkenyl (particularly vinyl) group containing organic sulfonic acids or derivative thereof that are members of the group of those having the formulae:

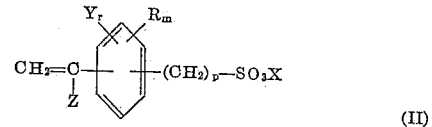

(Aromatic organic sulfonic acid compounds)

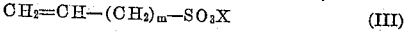

(Alkenyl organic sulfonic acid compounds)

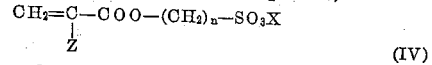

(Sulfoalkylacrylate organic sulfonic acid compounds)

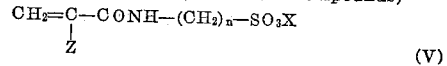

(Acryloyl taurine homolog compounds)

and

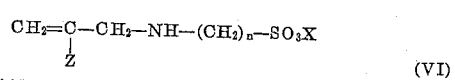

(Allyl taurine homolog compounds)

all wherein X is hydrogen, an aliphatic hydrocarbon radical containing from 1 to 4 carbon atoms or an alkali metal ion (including sodium, potassium and lithium); Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ is 1 to 4.

Within the main purpose and primary design of the present invention is the provision of the indicated varieties of graft copolymer products that are especially well suited for being incorporated in acrylonitrile polymer compositions, particularly compositions of polyacrylonitrile, to serve in one or more and advantageously all of the indicated capacities of dye-assisting adjuvants, antistatic agents and stabilizing ingredients, frequently in a simultaneous trebel capacity along each and all of the indicated lines.

It is also a principal aim and chief concern of the invention to provide and make available acrylonitrile polymer compositions and shaped articles therefrom that contain the presently contemplated type of graft copolymer additaments which compositions have, as intrinsic distinguishing characteristics, either excellent receptivity of and acceptability for any of a wide variety of dyestuffs; permanently imbued antistatic properties that are unusually good for and not commonly encountered in polymeric materials of the synthetic, essentially hydrophobic varieties of such substances; or efficacious natural stability to heat and light, as well as to certain chemical conditions, such as alkaline environments, or, advantageously, more than one or all three of such characteristics at one and the same time.

Within the scope and purview of the invention, there is comprehended (1) the novel and utile graft copolymer products of the indicated varieties; (2) the advantageous blended polymer compositions, particularly fiber-forming compositions, obtained by blending the graft copolymer products with acrylonitrile polymers; (3) various shaped articles fabricated from and comprised of the graft copolymer product-containing acrylonitrile polymer compositions; and (4) methods for the preparation of the above indicated compositions.

The graft copolymer blend compositions of the present invention which fulfill the above-indicated ends and offer coroliary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 percent by weight of acrylonitrile which, preferably, is of the fiber-forming variety and, most advantageously, is polyacrylonitrile and (B) a minor proportion of any of the above-indicated varieties of beneficial graft copolymer products or polymeric additaments, that function in the described manner.

The methods of the invention by which the herein contemplated advantageous compositions may be made involve preparation of the various graft copolymer products as well as incorporation of a minor proportion of such graft copolymer products as beneficial additaments in and with the acrylonitrile polymer base by any of several beneficial techniques, hereinafter more thoroughly defined, adapted to suitably accomplish the desired result.

Without being limited to or by the specific embodiments and modes of operation set forth, the invention is illustrated in and by the following didactic exemplifications wherein, unless otherwise indicated, all parts and percentages are to be taken on a weight basis.

ILLUSTRATION "A"

About 2000 grams of a polyethylene glycol monomethyl ether having an average molecular weight of about 600 and 98 grams of methyl methacrylate were charged to a 5000 ml. round bottom flask that was equipped with a distillation column. About 10 grams of para-toluene sulfonic acid was added to the reaction mass as a catalyst and 5 grams of hydroquinone as a polymerization inhibitor. The mixture was heated in an oil bath at 120° C. The methanol that was formed during the ensuing reaction (which is represented by the equations set forth in the subsequent specification) was removed through the column.

About 90 percent of the reactant materials were converted to the desired monomer product, as indicated by the quantity of collected methanol that was recovered during the reaction which was terminated after about a 6 hour period. The excess methyl methacrylate was then stripped from the reaction mass under a vacuum as represented by an absolute pressure of 20 mm. Hg at 120° C. The residue was a homogeneous, slightly colored liquid. Because of its low volatility, the monomer could not easily be purified by distillation.

In order to convert it to a condition suitable for polymerization, however, the hydroquinone inhibitor was removed from the heated reaction mass by passing the liquid product at room temperature through a column containing an anionic quaternary ammonium type of ion exchange resin ("Dowex-1"). This treatment also removed the slight coloration that was present in the reaction mass. Analysis of the monomeric composition indicated that it had a structural formula similar to that set forth in the Formula I, wherein Z was methyl, X was methoxy, $n$ had an average value of about 13 and $m$ was 0.

The monomeric product could be employed for the preparation of graft copolymers upon various N-vinyl-3-morpholinone polymers, such as poly-N-vinyl-3-morpholinone, either individually or in combination with monomeric sulfonic acids.

All of the graft copolymer products so obtainable provide beneficial results when incorporated in the acrylonitrile polymer fibers by and desired means such as by the technique set forth in subsequent Illustration "D."

ILLUSTRATION "B"

A 12 liter, 3-necked, round bottom flask was equipped with a mechanical agitator, a nitrogen bubbler tube (or sparger) and a fractionating column. The fractionating column had an internal diameter of about 65 mm. and a height of about 36 inches. It was packed with 8 by 8 mm. glass Rachig rings. The column was also equipped with a condenser and an automatic take-off head capable of being adjusted to any desired reflux ratio. The 12 liter flask was heated with an electrical mantle.

Into the flask there was charged about 5000 grams of a polyethylene glycol monomethyl ether having an average molecular weight of about 600; about 3000 grams of methyl methacrylate; about 250 grams of para-toluene sulfonic acid; and about 250 grams of hydrated copper sulfate ($CuSO_4 \cdot 5H_2O$). The toluene sulfonic acid was employed as a transesterification catalyst and the copper sulfate as a polymerization inhibitor. Nitrogen bubbling was commenced through the charged ingredients in the reactor. At the same time, the agitation was commenced and heat was applied to the reaction mass.

Within 20 minutes vapors were observed at the top of the fractionating column. The column was run on total reflux for about two hours to permit the overhead temperature to drop to about 66° C. which indicated that a mixture of about 35 percent vaporized methyl methacrylate and 65 percent vaporized methanol was passing out of the column. At this point the temperature of the reaction mass was about 110° C. The automatic take-off head was then set for about a 10 percent removal of condensate. At this reflux ratio, the overhead temperature in the fractionating column remained constant. After about 3 hours of additional operation, the overhead temperature in the fractionating column began to steadily increase. When the overhead temperature reached about 80° C., the heating of the reaction mass was discontinued, at which point its temperature was about 121° C.

The reaction mass was then permitted to cool for about an hour after which the toluene sulfonic acid was neutralized with about 200 grams of sodium acetate. Two liters of water were then added to the reactor and the contents thereof subjected to steam distillation until no sign of methyl methacrylate could be observed in the distillate. The residue in the reactor after the steam distillation was found to be comprised of a clear, green colored solution that contained some particles of polymer in the form of small round beads. The polymer particles were filtered from the reaction mass to yield about 6610 grams of a clear green aqueous solution containing the methoxy polyglycol methacrylate, the unreacted monomethyl ether of the polyglycol, copper sulfate and the neutralized toluene sulfonic acid.

The filtrate, upon analysis by bromination, was found to contain about 0.945 mole per kilogram of ethylenically unsaturated doublebonds ($C=C$). This corresponded to about a 75 percent yield of the desired monomeric methoxy polyglycol methacrylate.

About 5000 grams of the filtrate was extracted in a separatory funnel with about 4000 grams of dichloroethane by mixing the filtrate and the solvent together in a vigorous fashion. The separatory funnel was placed in a cold room for about 16 hours wherein it was maintained at a temperature of about −18° C. Upon removal from the cold room, it was found that two sharp layers had formed. The upper aqueous layer was light green in color. The lower oleaginous layer was clear and light brown in color. When the layers were separated and analyzed for C=C by bromination, the oil layer, consisting of about 6925 grams, was found to contain about 0.631 mole of C=C per kilogram and the water layer, consisting of about 2190 grams, was found to contain about 0.15 mole of C=C per kilogram. The weight increase of the oil layer was about 2925 grams. By material balance, about 93 percent of the unsaturated material was recovered in the single extraction with dichloroethane.

About 400 grams of a solution of the monomer and dichloroethane was prepared which, by bromine analysis, was found to contain about 0.48 mole C=C per kilogram of solution. The monomer solution was inhibited against polymerization by addition thereto of about one gram of hydroquinone. The inhibited solution was evaporated under vacuum (2 mm. Hg absolute) at a temperature of from 35 to 40° C. until all of the dichloroethane solvent had been essentially removed. The resulting monomer product weighed about 111 grams and was found to contain about 1.45 moles C=C per kilogram. Essentially no polymerization had occurred in the monomer recovery.

The resulting monomer product was a slightly viscous light brown liquid at room temperature. Its viscosity at 25° C. was about 52 centipoises and its density at the same temperature was about 1.104 grams per cubic centimeter. Its saponification equivalent weight was found to be about 656. The monomer, upon heating, was found to either decompose or polymerize before boiling. The monomer was soluble in water, methanol, ethanol, isopropanol, perchloroethylene, dichloroethylene, carbon tetrachloride, methyl ethyl ketone, methyl isobutyl ketone and acetone.

As is demonstrated in the subsequent examples, the monomer is advantageously well adapted to be converted to various graft copolymer products on N-vinyl-3-morpholinone polymer substrates, which products have excellent utility in connection with acrylonitrile polymer compositions for purposes of increasing their dye-receptivity, decreasing their static characteristics, and enhancing their stability to light, heat and alkaline media.

ILLUSTRATION "C"

Using the same apparatus as described in the second illustration, the following reaction mass is prepared:

| | Grams |
|---|---|
| Polyethylene glycol monochloride having a molecular weight of about 610 | 2500 |
| Methyl methacrylate | 1250 |
| Para-toluene sulfonic acid (96 percent) | 130 |

Nitrogen is bubbled through the reactor, heating commenced, and agitation started. Within about 25 minutes, vapor at 70° C. is observed in the top of the fractionating column. About one hour and 35 minutes later the overhead temperature of the column, which is operated at total reflux, is found to be about 66° C. The automatic take-off head is then set to remove about 10 percent of the reflux. After a total period of time from the start-up of about 6 hours, the overhead temperature in the fractionating column attains about 80° C. At this point, heating of the reactor is discontinued. About one liter of water and 100 grams of sodium acetate is then added to the reaction mass and steam introduced into the reactor to strip the remaining unreacted methyl methacrylate. The steam distillation is stopped when no trace of methyl methacrylate can be detected in the distillate.

After the steam distillation, the reaction mass is filtered to yield a clear brown solution. The total weight of filtered product obtained is about 3005 grams which, upon bromine analysis, is found to contain about 1.70 moles C=C per kilogram. This corresponds to a 94 percent yield of desired monomeric product. About 1000 grams of the reactor product is extracted with 1000 grams of dichloroethane in a separatory funnel. When the two layers are separated, the dichloroethane layer increases in weight to about 1838 grams. It analyzes about 0.96 mole C=C per kilogram by bromination.

Following the procedure described in the second illustration, about 408 grams of the oleaginous extraction layer is inhibited with about one gram of hydroquinone and evaporated under high vacuum at 35–40° C. until no detectable trace of solvent is evident. The recovered monomeric product is dark brown in color, but clear. Its viscosity (at 25° C.) is found to be about 60 centipoises and its density at the same temperature about 1.137 grams per cubic centimeter. By bromine analysis the monomer product contains about 1.88 moles of C=C per kilogram. Its saponification equivalent weight is about 551 and it decomposes or polymerizes prior to boiling upon being heated. Its solubility characteristics are about the same as set forth for the monomer described in Illustration "B."

Graft copolymers of the monomer on N-vinyl-3-morpholinone polymer substrates, as well as mixed graft copolymers on N-vinyl-3-morpholinone polymer substrates of the monomer with the mentioned monomeric organic sulfonic acids provide excellent polymeric additives having exceptional utility for increasing the dye-receptivity, benefiting the antistatic properties and lending to the stability of acrylonitrile polymers, particularly fiber-forming polymers and especially polyacrylonitrile, when utilized in the manner set forth in the subsequent illustrations.

ILLUSTRATION "D"

Into a one-liter, 3-necked, round bottomed flask that is equipped with an efficient agitator, a nitrogen sparger and a total reflux condenser, there is charged about 35 grams of the monomeric methoxy polyglycol methacrylate obtained in Illustration "B"; about 35 grams of poly-N-vinyl-3-morpholinone (PVM) (having a relative viscosity at 25° C. in water at a concentration of 1 gram PVM in 100 ml. of solution of about 1.85); about 280 grams of water; and about 0.7 gram of ammonium persulfate. The pH of the charge is adjusted to about 5 with hydrochloric acid. The charge is then heated to a temperature of about 60° C. and maintained at this level for about 33½ hours. Bromine analysis of the reaction mass after termination of the reaction indicates that about 80 percent of the monomer is converted to a graft copolymer product. The polymeric product is obtained in the reaction mass as a slightly colored, turbid solution containing about 17 percent of dissolved solids.

Polyacrylonitrile fibers containing about 6 percent of the above copolymer product are prepared by impregnating filamentary structures that are in aquagel condition (after having been salt-spun and wet-stretched) in and with a dissolved aqueous dispersion of the graft copolymer that contains about 1.5 percent polymer solids. The polyacrylonitrile aquagel fiber that is employed is obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 43 percent of dissolved zinc chloride to form a multiple filament tow. After being spun, the tow bundle of coagulated polyacrylonitrile aquagel fiber is washed substantially free from salt upon being withdrawn from the coagulating bath and then wet-stretched in three consecutive hot liquid stages for orientation to a total stretched length that is about thirteen times its original extruded length. Each of the hot liquid stages in which the fiber is stretched consists of a portion of the total mentioned aqueous impregnating bath of the dissolved graft copolymer additive. The first stage has about 1.5 percent of the additive; the second about 0.6 percent and the last about 0.3 percent. In this way, the fiber becomes impregnated with the copolymer during its orientation by stretching.

Following the impregnation, the aquagel fiber is irreversibly dried at 150° C. to destroy the water-hydrated structure and convert it to a finished fiber form. The finally obtained 2.7 denier fiber product has a tenacity of about 4.0 grams per denier, an elongation of about 26 percent, a dry yield strength of about 0.96 gram per denier, and a wet yield strength of about 0.82 gram per denier. The copolymer-containing acrylonitrile polymer fiber product is found to have excellent natural stability to heat and light as well as against becoming degraded under the influence of aqueous alkaline media at pH levels as high as 10. It is found to be nearly free of propensity to accumulate charges of static electricity upon handling.

In addition, the graft copolymer-containing sample has good color and hand and is dyeable with all classes of dyestuffs as applied under normal dyeing conditions.

The fiber product dyes well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL is performed at the 4 percent level according to conventional procedure in which the fiber sample is maintained for about one hour at the boil in the dye bath which contains the dyestuff in an amount equal to about 4 percent of the weight of the fiber (OWF). The dye bath also contains sodium sulfate in an amount equal to about 15 percent OWF and has a bath-to-fiber weight ratio of about 30:1, respectively. After being dyed, the fiber is rinsed thoroughly with water and dried for about 20 minutes at 80° C. The dye-receptivity of the Calcodur Pink 2BL-dyed fiber is then evaluated spectrophotometrically by measuring the amount of monochromatic light having a wave length of about 520 milli-microns from a standard source that is reflected from the dyed sample. A numerical value on an arbitrarily designated scale from zero to one hundred is thereby obtained. This value represents the relative comparison of the amount of light that is reflected from a standard white tile reflector that has a reflectance value of 316 by extrapolation from the 0–100 scale.

Lower reflectance values are an indication of better dye-receptivity in the fiber. For example, a reflectance value of about 20 to 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product is about 45.

The antistatic properties of the copolymer-containing fiber are then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested are found by determining their electrical resistances. Resistance, of course, is the reciprocal quantity of conductivity. In order to permit various fiber samples to be compared on a common basis, the conductivities of the samples tested are actually measured as volume resistivities according to the following formula:

Volume resistivity
$$= \frac{(\text{Resistance})(\text{cross-sectional area})}{\text{Path length between electrodes to which sample being tested is attached}}$$

The units of volume resistivity are ohm-cm.$^2$/cm.

Prior to being tested, the graft copolymer-containing polyacrylonitrile fiber prepared in the indicated manner is knitted into a piece of net-like fabric; portions of this fabric are then tested for resistivity as described above usually according to the following sampling procedure. One sample of the knitted fabric is tested without any further treatment; one sample is scoured and tested; one sample is vat dyed in the conventional manner with Jade Green (Cibanone Brilliant Green HF double paste; Color Index Vat Green 1) and tested; one sample is vat dyed and subjected to five (5) No. 3–A accelerated wash tests, each in accordance with the American Association of Textile Chemists and Colorists (AATCC) Manual, and tested; and another sample is vat dyed, subjected to ten (10) No. 3–A AATCC wash tests and tested. The actual resistivities of the samples are determined (after the sample being tested is conditioned for seventy-two hours at the particular temperature and relative humidity conditions involved in each of the tests) by tautly connecting a web-like sample of the fabric between two electrodes, each of which is 9 centimeters long spaced parallel 13 centimeters apart, and across which there is applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) are also tested in the indicated manner along with the graft copolymer-containing fiber in accordance with the present invention.

The results are set forth in the following tabulation which indicates the volume resistivities obtained at various relative humidities (R.H.) at 23° C. of each of the samples tested.

TABLE I

[Volume resistivities of various fiber samples compared to polyacrylonitrile fibers impregnated with graft copolymer of methoxy polyglycol methacrylate monomer on PVM]

| Sample | Volume Resistivity, ohm-cm.$^2$/cm. | | | |
|---|---|---|---|---|
| | 32 percent RH | 47 percent RH | 58 percent RH | 66 percent RH |
| Graft copolymer-containing fiber as made | 4.4×10$^{10}$ | 7.6×10$^9$ | 2.8×10$^9$ | 1.1×10$^9$ |
| Same as scoured | 2.4×10$^{11}$ | 4.5×10$^{10}$ | 1.4×10$^{10}$ | 3.1×10$^9$ |
| Same as vat dyed | 2.7×10$^{11}$ | 3.3×10$^{10}$ | 7.2×10$^9$ | 1.7×10$^9$ |
| Same as vat dyed and wash tested 5 times | 3.3×10$^{11}$ | 3.4×10$^{10}$ | 7.1×10$^9$ | 1.5×10$^9$ |
| Same as vat dyed and wash tested 10 times | 2.8×10$^{11}$ | 3.4×10$^{10}$ | 1.1×10$^{10}$ | 2.6×10$^9$ |
| Scoured cotton | 6.4×10$^9$ | 2.7×10$^8$ | 3.0×10$^7$ | 5.4×10$^6$ |
| Scoured wool | 5.0×10$^{12}$ | 2.7×10$^{11}$ | 1.9×10$^{10}$ | 3.3×10$^9$ |
| Scoured unmodified polyacrylonitrile fiber | 3.0×10$^{14}$ | 2.7×10$^{13}$ | 5×10$^{12}$ | 1.2×10$^{12}$ |

As is apparent in the foregoing, the graft copolymer-containing sample, even after being severely scoured, dyed and wash tested is exceptionally durable and has electrical conductance properties much superior to ordinary polyacrylonitrile and only slightly poorer than cotton. At the same time, the physical properties of the graft copolymer-containing fiber are excellent, being about equal to those of the unmodified polyacrylonitrile fiber.

ILLUSTRATION "E"

Following the procedure of Illustration "D" and using the same monomer and PVM substrate as therein employed, the following charge is made to the apparatus.

| | |
|---|---|
| Monomeric methoxy polyglycol methacrylate _____ grams__ | 37.4 |
| PVM _____ do____ | 87.0 |
| Water _____ do____ | 486 |
| Ammonium persulfate _____ do____ | 0.8 |
| pH (adjusted with HCl) _____ | 5 |

The reaction mass is maintained for 40 hours at about 50° C. After termination of the reaction, the C=C analysis indicates that about 90 percent of the monomer is converted to graft copolymer. The graft copolymer product is obtained as a slightly colored, turbid aqueous solution containing about 20 percent of polymeric solids. The graft copolymer product contains about 72 percent by weight of PVM and about 28 percent of graft copolymerized substituents from the monomer.

Polyacrylonitrile aquagel fibers are impregnated in the manner set forth in Illustration "D" using about a 1.5 percent aqueous solution of the graft copolymeric product as the impregnating bath in the first of the hot stretch stages; about a 0.6 percent solution in the second; and a 0.3 percent solution in the last stage. After being simultaneously oriented and impregnated with the graft copolymer, the aquagel fiber is dried at about 150° C. It is found to contain about 8 percent of the graft copolymeric additament intimately incorporated therein.

The graft copolymer-containing fiber has good color, excellent hand and is dyeable with all classes of dyes applied under normal dyeing conditions. Its 4 percent Calcodur Pink 2BL reflectance value is about 20. Its stability to light, heat and alkaline media having a pH as high as 10 are excellent. Its physical properties are approximately as follows:

| | |
|---|---|
| Denier _____ | 3 |
| Tenacity, grams per denier _____ | 4 |
| Elongation, percent _____ | 30 |
| Dry yield strength, grams per denier _____ | 0.9 |
| Wet yield strength, grams per denier _____ | 0.5 |

The volume resistivities under various conditions of relative humidity at 23° C. of the graft copolymer-containing fiber products are determined in the manner set forth in Illustration "D" after a portion of the fiber is scoured. The values found for the graft copolymer-containing fiber as made are about $1.9 \times 10^{11}$ ohm-cm.$^2$/cm. at 58 percent R.H.; and about $3.8 \times 10^{10}$ ohm-cm.$^2$/cm. at 66 percent R.H. The values for the scoured fiber samples are about $1.3 \times 10^{11}$ ohm-cm.$^2$/cm. at 58 percent R.H.; and about $2.4 \times 10^{11}$ ohm-cm.$^2$/cm. at 66 percent R.H.

In comparison, similar properties for a similar fiber impregnated only with about the same amount of PVM are about the same as an unmodified polyacrylonitrile fiber, being about $5 \times 10^{12}$ ohm-cm.$^2$/cm. at 58 percent R.H. and about $1.2 \times 10^{12}$ ohm-cm.$^2$/cm. at 66 percent R.H. The superiority and antistatic properties of the graft copolymer-containing fiber, even after severe scouring, is evidenced by comparison of the foregoing volume resistivity values with those obtained under the same conditions for cotton, wool and unmodified polyacrylonitrile fibers as set forth in the preceding Table 1.

ILLUSTRATION "F"

About 1730 grams of 45 percent aqueous solution of PVM; 8 grams of potassium persulfate and 9551 grams of water are charged into a 12-liter, round bottomed flask equipped with a mechanical agitator. The PVM solution is adjusted to pH 5 with acetic acid and then heated to a temperature of about 75° C. A vacuum of about 15 inches of mercury beneath atmospheric pressure is applied to the reactor and, over a period of about 2 hours, about 2725 grams of a 32.1 percent by weight solution of monomeric methoxy polyglycol methacrylate (obtained as in the second illustration) in dichloroethane and 7.8 grams of potassium persulfate in 750 ml. of water are added continuously to the flask under the applied vacuum. Water vapor is removed from the reactor as it forms. Within an hour after the final addition of monomer is completed, the temperature in the reactor rises to about 90° C. At this time the vacuum is removed and a nitrogen sparger and a total reflux condenser are added to the reactor. The reaction mass is then maintained for an additional 5 hour period at 90° C. under the influence of mechanical agitation and continued nitrogen sparging. At the end of this period, a graft copolymeric product is obtained as a light yellow, slightly turbid, slightly viscous aqueous having a dissolved solids content of about 15 percent. Bromine analysis of the reaction mass indicates that about 95 percent of the monomer is converted to graft copolymer product. The graft copolymer product is found to contain about 48 percent of PVM and about 52 percent of the graft copolymerized monomer substituents. Excellent results are obtained when the polymeric product is incorporated in acrylonitrile polymer fibers as an additive in the manner set forth in the preceding two illustrations.

ILLUSTRATION "G"

The general procedure of the foregoing three illustrations is employed to prepare a graft copolymer from the following charge which is polymerized for about 35 hours at a temperature of 50° C.:

| | |
|---|---|
| Monomeric methoxy polyglycol methacrylate (as in Illustration "B") ____ grams__ | 30.7 |
| Sodium vinyl benzyl sulfonate _____ do____ | 9.9 |
| PVM _____ do____ | 94.8 |
| Water _____ ml____ | 542 |
| Azobisisobutyronitrile _____ grams__ | 0.4 |
| pH of charge (adjusted with HCl) _____ | 6 |

An aqueous solution of a graft copolymer product having mixed graft copolymerized monomer substituents from the different monomers is obtained containing about 11 percent solids. The polymeric solution is colorless and only slightly turbid. Conversion of the monomers to graft copolymer is found to be about 95 percent. The graft copolymer product is found to contain about 22 percent of polymerized monomeric methoxy polyglycol methacrylate, about 8 percent of polymerized vinyl benzyl sulfonate and about 70 percent of PVM.

The graft copolymer product is found to be an excellent dye additive and permanent antistatic agent for acrylonitrile polymer fibers when it is incorporated in them in the manner set forth in Illustration "D" using a 1.5 percent aqueous solution of the polymer product as the impregnating bath in the first of three stages of the hot stretch system; a 0.5 percent solution in the second; and a 0.1 percent solution in the last. The fiber product that is obtained is white in color and has excellent hand. It contains about 4.5 percent OWF of the impregnated graft copolymer. Its physical properties are approximately as follows:

| | |
|---|---|
| Denier _____ | 3 |
| Tenacity, grams per denier _____ | 4.5 |
| Elongation, percent _____ | 32 |
| Dry yield strength, grams per denier _____ | 1 |
| Wet yield strength, grams per denier _____ | 0.9 |

The graft copolymer-containing fiber product is easily dyeable with all classes of dyestuffs. Its 4 percent Calcodur Pink 2BL reflectance value is about 16. The volume resistivities of the fiber under various conditions of relative humidity after subjecting the fiber sample to a severe scouring are about $5.7 \times 10^{11}$ ohm-cm.$^2$/cm. at 32 percent R.H.; about $2.6 \times 10^{10}$ ohm-cm.$^2$/cm. at 47 percent R.H.; about $3.9 \times 10^9$ ohm-cm.$^2$/cm. at 58 percent R.H. and about $1.1 \times 10^9$ ohm-cm.$^2$/cm. at 66 percent R.H.

ILLUSTRATION "H"

The procedure of Illustration "G" is duplicated excepting to employ the following charge and to conduct the polymerization for 23 hours.

| | | |
|---|---|---|
| Monomeric methoxy polyglycol methacrylate (from Illustration "B") | grams | 30.7 |
| Sodium vinyl benzyl sulfonate | do | 9.9 |
| PVM | do | 40.6 |
| Water | do | 375.6 |
| Azobisisobutyronitrile | do | 0.4 |
| pH of charge (adjusted with HCl) | | 6 |

A light colored, slightly turbid, 6 percent solids aqueous solution of the graft copolymer product is obtained. About 85 percent of the monomers are converted to graft copolymer product which is found to consist of about 35 percent of polymerized methoxy polyglycol methacrylate substituents; 12 percent of polymerized vinyl benzyl sulfonate substituents and 53 percent of PVM.

The graft copolymeric product is impregnated into polyacrylonitrile aquagel fibers in accordance with the foregoing procedure to obtain a graft copolymer-containing fiber in which there is intimately incorporated about 6 percent OWF of the graft copolymer additive. The graft copolymer-containing fiber product is white and has an excellent hand. Its denier is about 2.8; its tenacity about 3.5 grams per denier; its elongation about 35 percent; its dry yield strength about 1 gram per denier; and its wet yield strength about 0.9 gram per denier. The fiber product is readily dyeable to deep and level shades of coloration with all classes of dyestuffs. Its Calcodur Pink 2BL reflectance value is about 40. It has excellent electrical antistatic properties. After being scoured, its volume resistivities, upon being measured for its electrical conductivity in the foregoing manner, are found to be about $3 \times 10^{11}$ ohm-cm.$^2$/cm. at 32 percent R.H.; about $9.5 \times 10^9$ ohm-cm.$^2$/cm. at 47 percent R.H.; about $2.7 \times 10^9$ ohm-cm.$^2$/cm. at 58 percent R.H. and about $8 \times 10^8$ ohm-cm.$^2$/cm. at 66 percent R.H. Comparison of these values with those obtained under the same conditions for cotton, wool and unmodified polyacrylonitrile fibers as set forth in the preceding Table 1 provides excellent evidence of the superiority of the graft copolymer-containing fiber product as regards its static characteristics.

ILLUSTRATION "I"

The procedure of the foregoing illustration is repeated with the following charge that is polymerized for 16 hours at the 50° C. polymerization temperature:

| | | |
|---|---|---|
| Monomeric methoxy polyglycol methacrylate (from Illustration "B") | grams | 26.6 |
| 2-sulfo-ethyl methacrylate, sodium salt | do | 8.4 |
| PVM | do | 81.2 |
| Water | do | 476 |
| Potassium persulfate | do | 0.7 |
| pH of charge (adjusted with HCl) | | 6 |

About 86 percent of the monomers are converted to graft copolymer product. The polymer product is obtained as a light colored, slightly turbid solution in water that contains about 21 percent solids.

The polymeric solution obtained is directly impregnated at the boil into polyacrylonitrile aquagel fibers in the three stage hot stretch system described in the foregoing. The fiber product, which contains about 5 percent OWF of the graft copolymeric additive, is white and has an excellent hand. Its denier is about 2.5; its tenacity is about 4.6 grams per denier; its elongation about 30 percent; its dry yield strength about 1.1 grams per denier; and its wet yield strength about 0.9 gram per denier. The graft copolymer-containing fiber product is readily and easily dyeable with all classes of dyestuffs. Its 4 percent Calcodur Pink 2BL reflectance value is about 20. It has excellently low propensity to accumulate charges of static electricity as evidenced by the volume resistivity measurements under various conditions of relative humidity of a scoured sample of the fiber product. These are about $1.5 \times 10^{11}$ ohm-cm.$^2$/cm. at 32 percent R.H.; about $9.4 \times 10^9$ ohm-cm.$^2$/cm. at 47 percent R.H.; about $1.8 \times 10^9$ ohm-cm.$^2$/cm. at 58 percent R.H.; and about $6.7 \times 10^8$ ohm-cm.$^2$/cm. at 66 percent R.H., all taken at 23° C.

ILLUSTRATION "J"

The procedure of Illustration "I" is essentially duplicated excepting to employ the following charge and to conduct the polymerization for 24 hours.

| | | |
|---|---|---|
| Monomeric methoxy polyglycol methacrylate | grams | 26.6 |
| 2-sulfo-ethyl-methacrylate, sodium salt | do | 8.4 |
| PVM | do | 35.0 |
| Water | do | 280 |
| Ammonium persulfate | do | 0.7 |
| pH charge (adjusted with HCl) | | 6 |

About 95 percent of the monomers are converted to graft copolymer product containing about 37 percent of polymerized methoxy polyglycol methacrylate; about 12 percent of polymerized 2-sulfoethyl methacrylate units; and about 51 percent of PVM. The polymeric product is obtained from the reaction mass as a slightly colored, turbid viscous solution containing about 22.0 percent of dissolved graft copolymer solids.

Following the procedure of the preceding illustrations, the graft copolymer solution is directly impregnated at the boil into polyacrylonitrile fibers in the described three stage hot stretch operation. The fiber product is found to contain about 10 percent OWF of the graft copolymeric additive. The graft copolymer-containing fiber product is white in color and has an excellent hand. Its denier is about 2.8, its tenacity about 2.4 grams per denier, its elongation about 25 percent, its dry yield strength about 0.9 gram per denier and its wet yield strength about 0.8 gram per denier. The fiber product can be easily dyed to deep and level shades of coloration with all classes of dyestuffs. Its 4 percent Calcodur Pink 2BL reflectance value is about 19. Its antistatic properties and characteristics are excellent, even after scouring, vat dyeing with jade green in the manner set forth in Illustration "D" and vat dyeing following by five (5) No. 3A wash tests. To illustrate, the volume resistivities at 23° C. of the scoured sample are about $7.1 \times 10^9$ ohm-cm.$^2$/cm. at 32 percent R.H.; about $1.4 \times 10^9$ ohm-cm.$^2$/cm. at 47 percent R.H.; about $3.8 \times 10^8$ ohm-cm.$^2$/cm. at 58 percent R.H., and about $2.1 \times 10^8$ ohm-cm.$^2$/cm. at 66 percent R.H. The volume resistivities of the vat dyed sample are about $7.3 \times 10^{10}$ ohm-cm.$^2$/cm. at 32 percent R.H.; about $2 \times 10^9$ ohm-cm.$^2$/cm. at 47 percent R.H.; about $2.3 \times 10^8$ ohm-cm.$^2$/cm. at 58 percent R.H.; and about $6.9 \times 10^7$ ohm-cm.$^2$/cm. at 66 percent R.H. Those of the vat dyed and wash tested sample are about $1.4 \times 10^{11}$ ohm-cm.$^2$/cm. at 32 percent R.H.; about $1.8 \times 10^9$ ohm-cm.$^2$/cm. at 47 percent R.H.; about $1.7 \times 10^8$ ohm-cm.$^2$/cm. at 58 percent R.H.; about $3.8 \times 10^7$ ohm-cm.$^2$/cm. at 66 percent R.H. As is apparent, even after such severe treatments as scouring, vat dyeing, and vat dyeing plus wash testing, the electrical conductivity of the graft copolymer containing fiber product is superior to that of wool and unmodified polyacrylonitrile fibers, as is evidenced by comparison of the stated values with equivalent values under the same conditions for the wool and polyacrylonitrile fibers that are set forth in Table 1.

ILLUSTRATION "K"

The procedure of illustration "J" is repeated to prepare a graft copolymer from about 68.2 grams of the monomeric methoxy polyglycol methacrylate obtained as in Illustration "B"; 20.6 grams sodium styrene sulfonate; 207 grams of PVM; 1081 grams of water, and 1.8 grams of ammonium persulfate. After adjusting the pH of the reaction mass to about 6 with hydrochloric acid, the polymerization is effected at 50° C. during a 28 hour period. The graft copolymer product is obtained as a nearly clear aqueous solution containing about 21 percent of dissolved solids. Ninety-three (93) percent of the monomers are converted to graft copolymer product which is comprised of about 22 percent of polymerized methoxy polyglycol methacrylate units; 7 percent of polymerized sodium styrene sulfonate; and 71 percent PVM. The graft copolymer solution is impregnated at the boil into polyacrylonitrile aquagel fibers in the three stage hot stretch operation in the manner set forth in the foregoing examples. The graft copolymer-containing fiber product is white and has an excellent hand. The fiber product contains about 6 percent OWF of the graft copolymeric additive. Its denier is about 2.5; its tenacity about 4.4 grams per denier; its elongation about 23 percent; its dry yield strength about 1.1 grams per denier; and its wet yield strength about 0.9 gram per denier. The fiber product is easily and readily dyeable with all classes of dyestuffs. The 4 percent Calcodur Pink 2BL reflectance value of the fiber product is about 30. The volume resistivity at 23° C. of a scoured sample of the fiber is about $1.2 \times 10^{13}$ ohm-cm.$^2$/cm. at 32 percent R.H.; about $3.9 \times 10^{11}$ ohm-cm.$^2$/cm. at 47 percent R.H.; about $3.2 \times 10^{10}$ ohm-cm.$^2$/cm. at 58 percent R.H.; and about $5.3 \times 10^9$ ohm-cm.$^2$/cm. at 66 percent R.H. The values of a jade green dyed and five (5) times No. 3–A wash tested sample of the fiber product are about $1.1 \times 10^{13}$ ohm-cm.$^2$/cm. at 32 percent R.H.; about $3.7 \times 10^{11}$ ohm-cm.$^2$/cm. at 47 percent R.H.; about $2.6 \times 10^{10}$ ohm-cm.$^2$/cm. at 58 percent R.H. and about $2.6 \times 10^9$ ohm-cm.$^2$/cm. at 66 percent R.H.

ILLUSTRATION "L"

The procedure of Illustration "J" is again duplicated with the following charge excepting to conduct the polymerization for 19 hours at 60° C. and to adjust the pH of the reaction mass to about 5 with hydrochloric acid prior to the polymerization:

| | Grams |
|---|---|
| Monomeric methoxy polyglycol methacrylate | 28.7 |
| Sodium styrene sulfonate | 8.6 |
| PVM | 37.3 |
| Water | 300 |
| Ammonium persulfate | 0.8 |

A very viscous aqueous solution is obtained containing about 14 percent of graft copolymer solids. The graft copolymer product is comprised of about 38 percent of polymerized methoxy polyglycol methacrylate units, 11 percent of polymerized styrene sulfonate units and 53 percent PVM. About 91 percent of the monomers are converted to graft copolymer product.

Polyacrylonitrile fibers containing about 6 percent OWF of the graft copolymer additive are prepared by impregnating the graft copolymer solution obtained as a product into the fibers during their hot stretching by orientation wherein the polymeric solution is employed at the boil in the simultaneous capacity of a hot stretching medium and an impregnating bath for the fibers. The graft copolymer-containing fiber product has a denier of about 2.7; a dry yield strength of 1 gram per denier and a wet yield strength of about 0.8 gram per denier. It can be dyed without difficulty with all classes of dyestuffs to deep and level shades of coloration. Its Calcodur Pink 2BL reflectance value is about 45. The volume resistivities of the scoured graft copolymer containing fiber product at 23° C. are about $1.3 \times 10^{12}$ ohm-cm.$^2$/cm. at 32 percent R.H.; about $4.3 \times 10^{10}$ ohm-cm.$^2$/cm. at 47 percent R.H.; about $5.2 \times 10^9$ ohm-cm.$^2$/cm. at 58 percent R.H.; and about $1.2 \times 10^9$ ohm-cm.$^2$/cm. at 66 percent R.H.

ILLUSTRATION "M"

About 70 grams, on a dry weight basis, of a polyacrylonitrile aquagel that is oriented by stretching to a total length of about 13 times its original extruded length is immersed for about 20 hours in about 2 liters of a 1.5 percent aqueous solution of a similar copolymeric product to that described in Illustration "D" with the exception that the graft copolymer is prepared with a preformed polymer substrate consisting of a 50–50 random copolymer of N-vinyl-3-morpholinone and N-vinyl-5-methyl-2-oxazolidinone. After the impregnation, the aquagel fiber is removed from the impregnating bath, washed three times with distilled water, and subsequently dried at 140° C. The resulting fiber product, which contains about 5 percent of the impregnated graft copolymeric additive is white and has a soft and attractive hand. It is found to have good receptivity of practically all classes of dyestuffs. The 4 percent Calcodur Pink 2BL reflectance value of the graft copolymer-containing fiber product is about 45. The volume resistivities of the graft copolymeric additive-containing fiber product as made, measured at 23° C., are about $1 \times 10^{12}$ ohm-cm.$^2$/cm. at 32 percent R.H.; about $2.1 \times 10^{11}$ ohm-cm.$^2$/cm. at 47 percent R.H.; about $5.3 \times 10^{10}$ ohm-cm.$^2$/cm. at 58 percent R.H.; and about $9.2 \times 10^9$ ohm-cm.$^2$/cm. at 66 percent R.H. A jade green vat dyed sample of the graft copolymer-containing fiber product has a volume resistivity at 32 percent R.H. of about $3.6 \times 10^{12}$ ohm-cm.$^2$/cm. At 47 percent R.H., its volume resistivity is about $3.2 \times 10^{11}$ ohm-cm.$^2$/cm.; at 58 percent R.H., it is about $2.7 \times 10^{10}$ ohm-cm.$^2$/cm.; and at 66 percent R.H., it is about $3.9 \times 10^9$ ohm-cm.$^2$/cm. A jade green vat dyed sample of the same fiber product that is first subjected to five (5) No. 3–A wash tests has a volume resistivity of about $1.7 \times 10^{12}$ ohm-cm.$^2$/cm. at 32 percent R.H. while its volume resistivities at 47, 58 and 66 percent R.H. are about $3 \times 10^{10}$; $1.7 \times 10^9$; and $3.8 \times 10^8$ ohm-cm.$^2$/cm.; respectively.

ILLUSTRATION "N"

When the procedures of Illustrations "D" through "M" are repeated excepting to employ the monomer of Illustration "C" for the preparation of various polymer products, similar excellent results are obtained.

ILLUSTRATION "O"

Three hundred (300) grams of N-vinyl morpholinone, 1200 grams of water and 1.5 grams of a polymerization catalyst (azobisisobutyronitrile) are charged to a reactor that is equipped with an agitator, a nitrogen sparger, and a total reflux condenser. The pH of the solution is 6.0. The mixture is polymerized for 5 hours at 68° C. under nitrogen. Conversion to a water soluble polymer of PVM is about 95 percent. The relative viscosity of the polymer in water at 25° C. is about 1.85 at a concentration of 1 gram in 100 ml. of solution.

About 250 grams of the thereby obtained PVM, 2585 grams of water and 2.5 grams of potassium persulfate (catalyst) are combined in a reactor and heated to about 80° C. with stirring while under a vacuum of about 14 inches of mercury. Monomeric methoxy polyglycol methacrylate as a 30.5 percent solution in 1,2-dichloroethane is added continuously at a slow rate to allow the solvent to be flashed off. At the same time a solution of 5 grams of potassium persulfate in 250 ml. of water is simultaneously added. The pH of solution is 5.0. After this addition period of about 2.5 hours, the vacuum is cut off and nitrogen is bubbled through the solution. Heating is then continued for another 3.5 hours to complete the polymerization. The graft copolymer product is a nearly colorless water-dispersible gel that is useful as an additive in acrylonitrile polymer fibers when employed in the above-indicated manner for the herein contemplated purpose.

ILLUSTRATION "P"

Another excellent graft copolymer additive product for blending with acrylonitrile polymers to form high quality fiber-forming compositions is prepared by polymerizing the following charge (with pH adjusted to about 8) under nitrogen at 50° C. for 16 hours (and subsequently utilizing it as above demonstrated):

| | Parts |
|---|---|
| Monomeric methoxy polyglycol methacrylate | 4.0 |
| PVM | 4.0 |
| Water | 45.4 |
| Hydrogen peroxide (28.6 aq.) | 0.31 |

The product is a clear, colorless solution of high viscosity. Conversion is essentially complete.

Excellent results may also be obtained when the foregoing is repeated to prepare and employ as additives other graft copolymer products of the monomeric polyglycol monoesters of Formula I on N-vinyl-3-morpholinone polymer substrates that are within the scope of the present invention as well as other graft copolymers on N-vinyl-3-morpholinone polymer substrates of any of the monomeric polyglycol monoesters of Formula I employed for the preparation of the graft copolymeric products in monomeric mixtures with one or more of any of the monomeric vinyl group-containing organic sulfonic acid compounds of the Formulae II, III, IV, V and VI.

Excellent results may likewise be obtained when the foregoing is repeated to prepare graft copolymer additives from various copolymeric preformed polymer substrates of N-vinyl-3-morpholinone containing substantial proportions (generally at least about 10 weight percent) of the essential N-vinyl-3-morpholinone polymerized in the copolymer molecule, with any balance being another polymerized ethylenically unsaturated monomeric material (preferably monoethylenically unsaturated) that is copolymerizable with N-vinyl-3-morpholinone, advantageously to provide water-soluble copolymeric materials.

Results similar to those set forth in the foregoing can similarly be obtained when any of the indicated varieties of graft copolymeric additaments are incorporated in polyacrylonitrile and other acrylonitrile polymer fibers to provide articles in accordance with the present invention by blending the graft polymeric additaments and the fiber-containing acrylonitrile polymer in a spinning composition or dope prior to its extrusion into filamentary products by either wet spinning or dry spinning techniques. In such instances, incidentally, it may be desirable, in order to secure optimum benefit in the practice of the invention, to employ relatively larger quantities of the polymeric additament than when surface impregnation is performed so that the presence of effective quantities of the additament at or near the peripheral portion of the article is assured.

The monomeric polyglycol monoester compounds of Formula I that are used for the preparation of graft copolymeric additives in the practice of the present invention are generally relatively non-volatile, clear or lightly colored liquids that have the above-indicated generic structure. Besides being soluble in water, such monomers, as has been indicated, are also soluble in alcohols, chlorinated hydrocarbons and other organic solvents, including ketones, ethers such as diethyl ether, amides, amines, dimethyl formamide and the like. Ordinarily the monomers are not particularly soluble in such liquids as straight hydrocarbon solvents.

The monomeric polyglycol monoester compounds, as has been demonstrated, may be prepared by a method which involves condensing an alkyl acrylate or methacrylate with a polyglycol that has a non-reactive terminal end group (or, as may otherwise be stated, has but a single reactive hydroxyl group in its constitution). Preferably, a lower alkyl acrylate or methacrylate is employed such as one in which the alkyl unit contains not more than 4 carbon atoms. The preparation of such monomers may be typified by the following reaction between methyl methacrylate and a polyethylene glycol monomethyl ether.

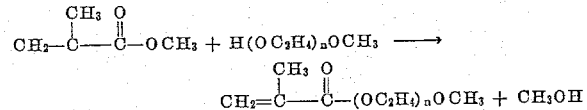

wherein $n$ is a number having an average of from 5 to 100. Advantageously, the condensation reaction is accomplished in the presence of an acid catalyst (such as para-toluene sulfonic acid) and a polymerization inhibitor (such as hydroquinone) in order to avoid premature polymerization of the monomer. Generally, an amount of the catalyst up to about 10 percent by weight, based on the weight of the reactants, may be required for the accomplishment of the condensation. Frequently, only 5 percent or less of the catalyst is needed. Usually relatively greater quantities of the catalyst are necessary to employ when the reaction is performed by batchwise techniques instead of according to continuous processing arrangements. Other catalysts that may be employed include sulfonic acid, phosphoric acid and the like. If desired, the monomer-preparing reaction may be conducted in a suitable solvent vehicle, such as benzene, toluene, ethylene dichloride or carbon tetrachloride. The reaction may be performed with benefit at temperatures from about 60 to 140° C., depending on the particular solvent employed. Better results in the preparation of the monomer may often be obtained when the temperature is maintained between about 90 and 120° C. The monomeric polyglycol monoester-preparing reaction will occur under any desired pressure. It is generally convenient for it to be conducted under reflux conditions. Ordinarily, good conversions and yields of desired product from the converted starting materials (including 100 percent conversions) can be realized within reaction periods of 20 hours or less. By way of illustration, conversions in the neighborhood of 90 percent or greater of the reactant materials to the desired monomer are not unusual. For many purposes, such as and particularly when the monomer is desired to be converted into graft copolymer products, it is generally unnecessary to isolate the monomer from the reaction mass in which it was prepared. This is for the reason that it can be readily obtained in the reaction mass in a condition in which it is free from interfering impurities by the expedient of removing the unused alkyl acrylate starting material and any polymerization inhibitor that may have been employed. As is apparent, the monomeric polyglycol monoester compounds used in the practice of the present invention may advantageously be prepared from particular varieties of polyethylene glycols although, if desired, beneficial results may be obtained when they are manufactured from polyglycols of a similar type that are comprised of mixtures of oxyethylene and oxypropylene units.

Besides those specifically illustrated herein and included in the Formulae II, III, IV, V and VI, other monomeric organic sulfonic acid compounds may also be utilized for the preparation of the graft copolymers of the present invention such, by way of illustration, as those which are set forth in the disclosure of United States Letters Patent Number 2,527,300. In addition to the graft copolymer products specifically described in the foregoing illustrations, other useful graft copolymeric additaments may advantageously be prepared with the monomeric polyglycol monoesters of Formula I with such organic sulfonic acid compounds as 2-propene sulfonic acid; sodium para-vinylbenzene sulfonate; 2- and/or 3-sulfopropyl acrylate; α-sulfoacrylic acid; sodium vinyl toluene sulfonate; potassium ortho-chlorostyrene sulfonate; 2-hydroxy-3-sulfopropyl acrylate; sodium salt; sodium 3-allyl-oxyl-2-hydroxypropane sulfonate; 4-sulfophenyl acrylate, sodium salt; N-allyl imino di-(2-ethane sulfonic acid); and the like, or with mixtures of such monomers graft copolymerized upon various N-vinyl-3-morpholinone polymer substrates.

Still other organic sulfonic acid compounds that may be employed are as set forth in the following representative (but by no means exhaustive) listing, wherein they are grouped according to the several types indicated in the foregoing specification.

*Aromatic Alkenyl-Containing Sulfonic Acid Compounds (Formula II)*

Para-styrene sulfonic acid
Ortho-styrene sulfonic acid
Para-isopropenyl benzene sulfonic acid
Para-vinyl benzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho-vinyl benzene sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene 6-sulfonic acid, sodium salt
2-ethyl-4-vinyl benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt

*Alkenyl Sulfonic Acid Compounds (Formula III)*

Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
1-butylene 4-sulfonic acid, n-butyl ester
1-butylene 3-sulfonic acid
Tertiary butylene sulfonic acid

*Sulfoalkylacrylate Compounds (Formula IV)*

Sulfomethylacrylate
2-sulfoethylacrylate
Sulfomethylmethacrylate, sodium salt
2-sulfoethylmethacrylate, methyl ester
2-sulfoethylmethacrylate, potassium salt

*Acryloyl Taurine and Homolog Compounds (Formula V)*

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminomethane sulfonic acid
N-methacryloyl-aminomethane sulfonic acid, sodium salt
Methyl N-methacryloyl-aminomethane sulfonate

*Allyl Taurine and Homolog Compounds (Formula VI)*

Allyl taurine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-allyl-aminomethane sulfonate
Lithium N-methallyl-aminomethane sulfonate
n-Butyl N-allyl-aminomethane sulfonate The N-vinyl-3-morpholinone polymers that are utilized as preformed substrates in the preparation of the graft copolymeric additaments of the present invention have, as an essential constituent of their polymeric structure, characterizing proportions of the recurring group

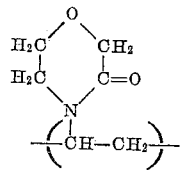

As has been indicated, copolymers of N-vinyl-3-morpholinone may also be employed. Thus, copolymers of N-vinyl-3-morpholinone with various homologous alkyl ring-substituted N-vinyl-3-morpholinone monomers may be utilized, such as copolymers of N-vinyl-3-morpholinone with N-vinyl-5-methyl-3-morpholinone, N-vinyl-5-ethyl-3-morpholinone, and the like. Copolymers of N-vinyl-3-morpholinone with various N-vinyl lactam polymers, such as N-vinyl-2-pyrrolidone, N-vinyl-piperadone, N-vinyl caprolactam, N-vinyl-5-methyl-2-pyrrolidone and the like may also be prepared. Advantages are also achieved with copolymers of N-vinyl-3-morpholinone and various of the N-vinyl-2-oxazolidinone monomers, such as N-vinyl-2-oxazolidinone, N-vinyl-5-methyl-2-oxazolidinone, N-vinyl-5-ethyl-2-oxazolidinone, and so forth.

These N-vinyl-3-morpholinone polymers and their preparation are discussed in U.S. Patents 2,952,668, filed April 16, 1958; 2,946,772, filed February 27, 1958; and 2,948,708, filed April 3, 1958; and in the co-pending application for U.S. patent having Serial No. 692,587, now U.S. 2,987,509, filed October 28, 1957, and entitled "N-Vinyl-3-Morpholinone Compounds."

Advantageously, the N-vinyl-3-morpholinone polymer that is used in the manufacture of the graft copolymer product has a Fikentscher K-value between about 10 and 100 and, more advantageously, between about 20–30 and 60.

Beneficially, as mentioned, the N-vinyl-3-morpholinone polymer that is utilized is a water-soluble material. In cases where N-vinyl-3-morpholinone copolymers are employed that tend to water-insolubility with decreasing proportions of N-vinyl-3-morpholinone in the copolymer molecule (as is the case with copolymers of N-vinyl-3-morpholinone and N-vinyl-5-methyl-2-oxazolidinone), it is generally most desirable for the copolymer to contain at least about 40 weight percent of the N-vinyl-3-

The monomeric polyglycol monoesters of the Formula I morpholinone polymerized therein. This avoids working with a product that may have a cloud (or precipitation) point in water or other aqueous solution beneath the boil. that are employed in the practice of the present invention will undergo polymerization in mass (which is oftentimes referred to as "bulk polymerization") as well as polymerization in aqueous or other solution or in emulsion or other dispersion in liquids in which the monomer is insoluble or immiscible in order to form the copolymeric additives that may be used for blending in the acrylonitrile polymer compositions. It is ordinarily beneficial for such polymerization to be conducted at a temperature between about 50° and 90° C. Suitable catalysts or initiators for polymerization including graft copolymerization for present purposes of the monomer of Formula I include the azo catalysts, such as azobisisobutyronitrile, peroxygen catalysts, such as potassium persulfate, the various known redox systems and irradiation under the influence of high energy fields. The latter catalyzation may include the various, diverse actinic radiations, such as ultraviolet, X-ray and gamma radiations, as well as radiations from radioactive materials, such as cobalt-60 and the like. The monomeric polyglycol monoesters will also undergo thermal polymerization without using catalyzing agents by simply heating them in air at a temperature of 60° C. or so.

The graft copolymers may be prepared in either aqueous or organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

Infrared and ultraviolet analysis of the graft copolymer products on N-vinyl-3-morpholinone polymer substrates of the monomeric polyglycol monoesters of Formula I produce spectra conforming to an expectable pattern.

The compositions of the graft copolymers of the present invention can vary within rather wide limits. When only the monomeric acrylate or methacrylate polyglycol monoester is utilized in the preparation of the graft copolymers, it is advantageous for the content of the monomer that is graft copolymerized on the substrate N-vinyl-3-morpholinone polymer to be between about 10 and 80 percent by weight of the resulting graft copolymer product. More advantageously, between about 30 and 60 percent by weight of the graft copolymer product may be comprised of substituents from the graft copolymerized monomer. In many cases, especially to secure optimum dye-receptivity, nearly equivalent or about commensurate or equal weight proportions of the N-vinyl-3-morpholinone polymer and the monomeric constituent graft copolymerized thereto may be employed with benefit for the preparation of the graft copolymeric additaments. When graft copolymeric products are prepared from mixtures of the monomeric acrylate or methacrylate polyglycol monoesters and the monomeric organic sulfonic acid compounds, it is also desirable for the content of graft copolymerized monomeric constituents to be about 10 and 80 percent by weight, more advantageously between about 30 and 60 percent by weight, of the resulting graft copolymer product. It is also usually desirable in the instances where mixed monomers are graft copolymerized for about commensurate weight proportions of the N-vinyl-3-morpholinone polymer and the monomeric constituent graft copolymerized thereto to be obtained in the graft copolymeric product. When mixtures of monomers are employed for preparing the graft copolymeric product, it is advantageous for from about 10 to 90 mole percent of the mixture of monomers to be comprised of the monomeric acrylate or methacrylate polyglycol monoester. It is generally more desirable and of greater advantage in such instances for the mixtures of monomers that are utilized to prepare the graft copolymer to be comprised of from 30 to 60 mole percent of the monomeric polyglycol monoester.

The polymerization system that is employed for the preparation of any of the polymeric products of the present invention may consist of as much as 50 percent by weight of the mixture polymerizable ingredients (i.e., combinations of monomers and substrate N-vinyl-3-morpholinone polymers) to be polymerized in the aqueous or other medium. The amount of polymerizable constituents that are provided in the graft polymerization system may be influenced somewhat by the manner in which it is intended to incorporate the product in the synthetic polymer compositions in order to provide the graft copolymer-containing acrylonitrile polymer compositions of the invention.

If, for example, it is intended to incorporate the polymer product by blending into a fiber-forming composition prior to its fabrication into shaped articles, the polymerization system may, if desired, contain about equal proportions by weight of the charged polymerizing constituents and the polymerization medium which, preferably, is miscible with and tolerable in the spinning solution solvent intended to be used. In such cases, the polymer product may ordinarily be readily isolated from unreacted monomer and directly incorporated in the fiber-forming composition. If the incorporation of the polymeric additive in a fiber-forming composition is to be achieved by impregnation therewith of an already formed shaped article of the composition, it may be desirable to effect the copolymerization so as to directly form a suitable applicating solution (or suspension in the cases where a non-solvent polymerization vehicle is employed) of the polymeric additament product. For such purposes, the polymerization system may be prepared to contain as little as 5 or 10 percent by weight of the polymerizing ingredients. Such a method for preparing the polymeric products may be especially appropriate when they are intended, in the practice of the present invention, to be applied to acrylonitrile polymer fibers and the like that are derived from aquagels in the course of their manufacture, such as acrylonitrile polymer fibers that are wet spun from aqueous saline solutions of the fiber-forming polymer.

In such instances, as has been demonstrated, the polymeric additament may be impregnated into the fiber from aqueous solution while the fiber is in a swollen or gel condition, as a polyacrylonitrile fiber in an aquagel condition, in order to obtain the desired polymer-containing product.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity, antistatic properties and stability may frequently be obtained when a quantity of the polymeric additament that is as small as 2 (and even as low as 1 or less) percent by weight is employed. Advantageously, an amount between about 5 and 12 percent by weight of the polymeric additament may thus be utilized in the composition. Greater advantages may often accrue when the amount of the polymeric additament that is incorporated in the composition is in the neighborhood of 6–10 percent by weight, based on the weight of the composition.

As has been indicated, the graft copolymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber forming and the like. Beneficially, the polymeric additives and the acrylonitrile polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming systems by sequentially dispersing the diverse polymers in any desired order in a suitable medium, as by incorporating the polymeric additament in a prepared acrylonitrile polymer spinning solution, dope or the like.

As is evident from the exemplifying illustrations heretofore included, a highly advantageous technique for providing the compositions, particularly when acrylonitrile polymer fiber products are involved, is to apply or impregnate the polymeric additament from a dissolved aqueous dispersion thereof to a shaped acrylonitrile polymer article that is in an aquagel condition in a known manner. Thus, an acrylonitrile polymer filamentary article that has been spun from an aqueous saline solution may be conveniently passed, after its coagulation and while it is in an aquagel condition, through a water bath containing the dissolved (or otherwise efficiently dispersed) graft copolymer additament in order to impregnate the filament with the polymer product and provide a composition and an article in accordance with the invention. In addition, if desired, in situ polymerization techniques may also be relied upon to provide certain forms of the graft copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbon, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The modified and graft copolymer additive-containing acrylonitrile polymer fiber products in accordance with the present invention (one of which is schematically illustrated in the sole FIGURE of the accompanying drawings) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American Prototype Number 244), Calcodur Pink 2BL (Colour Index 353, also more recently, Colour Index Direct Red 75), Napthol ASMX (Colour Index 35527), Fast Red TRN Salt (Colour Index Azoic Diazo Component 11), and Immedial Bordeaux G (Colour Index Sulfur Brown 12) may be advantageously employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Leveling Blue 2R (Colour Index Acid Blue 51), Amacid Azo Yellow G Extra (Colour Index Acid Yellow 63); such mordant-acid dyes as Alizarine Light Green GS (Colour Index Acid Green 26); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (both Colour Index Dispersed Red 15), Celanthrene Pure Blue BRS 400 percent (Colour Index Dispersed Blue 1) and Acetamine Yellow N (Colour Index Dispersed Yellow 32); B-napthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetalized dyestuffs.

The dyed products are generally lightfast and stable to heat and are well imbued with a good resistance to crocking. In addition, the dyed products exhibit good washfastness and retain the dye-assisting copolymeric additament in a substantially permanent manner, despite repeated exposure and subjection to washing, laundering and dry cleaning treatments.

What is claimed is:

1. A graft copolymer of between about 10 and 80 weight percent of (a) a monomeric polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms; $n$ is a number having an average value of from 5 to 100; and $m$ is a number that has an average value from 0 to 10; and (b) from about 90 to 20 weight percent of a polymerized monoethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

2. The graft copolymer of claim 1 containing in the polymer molecule between about 30 and 60 percent by weight of said monomeric polyglycol monoester graft copolymerized on said N-vinyl-3-morpholinone polymer.

3. The graft copolymer of claim 1 wherein said N-vinyl-3-morpholinone polymer is poly-N-vinyl-3-morpholinone.

4. Graft copolymer of between about 10 and 80 weight percent of (a) a mixture of monomers consisting of (1) from about 10 to 90 mole percent of a monomeric polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms; $n$ is a number having an average value of from 5 to 100; and $m$ is a number that has an average value from 0 to 10; and (2) from about 90 to 10 mole per cent of a monomeric, alkenyl group containing organic sulfonic acid compound selected from the group consisting of those represented by the formulae:

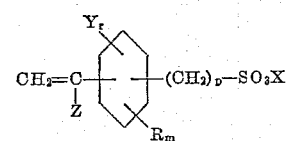

(II)

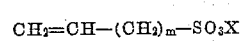

(III)

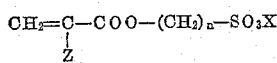

(IV)

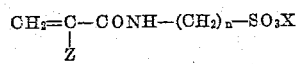

(V)

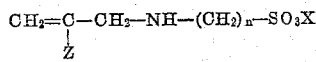

(VI)

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4; and (b) from about 90 to 20 weight percent of polymerized monomethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

5. The graft copolymer of claim 4 containing in the polymer molecule between about 30 and 60 weight percent of said mixture of monomers copolymerized of said N-vinyl-3-morpholinone polymer.

6. The graft copolymer of claim 4, wherein said mixture of monomers consists of from about 30 to 60 mole percent of said monomeric polyglycol monoester of said formula (I) and from about 70 to 40 mole percent of said sulfonic acid compound of formulae (II), (III), (IV), (V), and (VI).

7. The graft copolymer of claim 4, wherein said N-vinyl-3-morpholinone polymer is poly-N-vinyl-3-morpholinone.

8. Method for the preparation of a graft copolymer which comprises polymerizing between about 10 and 80 weight percent, based on the weight of the resulting graft copolymer, of a monomeric polyglycol monoester of the formula:

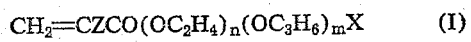

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms, $n$ is a number having an average value of from 5 to 100; and $m$ is a number that has an average value from 0 to 10; with between about 90 and 20 weight percent of a polymerized monoethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

9. Method for the preparation of a graft copolymer which comprises polymerizing between about 10 and 80 weight percent, based on the weight of the resulting graft copolymer, of (a) a mixture of monomers consisting of (1) from about 10 to 90 mole percent of a monomeric polyglycol monoester of the formula:

$$CH_2=CZCO(OC_2H_4)_n(OC_3H_6)_mX \quad (I)$$

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms; $n$ is a number having an average value of from 5 to 100; and $m$ is a number that has an average value from 0 to 10; and (2) from about 90 to 10 mole percent of a monomeric alkenyl group-containing organic sulfonic acid compound selected from the group consisting of those represented by the formulae:

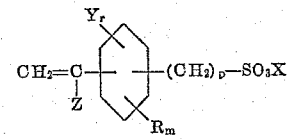

(II)

$CH_2=CH-(CH_2)_m-SO_3X$ (III)

$CH_2=C-COO-(CH_2)_n-SO_3X$
  |
  Z (IV)

$CH_2=C-CONH-(CH_2)_n-SO_3X$
  |
  Z (V)

$CH_2=C-CH_2-NH-(CH_2)_n-SO_3X$
  |
  Z (VI)

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4; with (b) between about 90 and 20 percent by weight of a polymerized monoethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

10. A composition comprising a major proportion of at least about 80 weight per cent, based on composition weight of (A) a polymerized ethylenically unsaturated monomeric material containing at least about 80 percent by weight of polymerized acrylonitrile, and (B) a minor proportion of up to about 20 weight percent, based on composition weight, of a graft copolymer of (a) between about 10 and 80 weight percent of a monomeric polyglycol monoester of the formula:

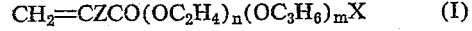

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms; $n$ is a number having an average value of from 5 to 100; and $m$ is a number that has an average value from 0 to 10; and (b) from about 90 to 20 weight percent of a polymerized monoethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

11. The composition of claim 10 containing between about 5 and 12 weight percent, based on the weight of the composition, of said graft copolymer.

12. The composition of claim 10, wherein said graft copolymer contains between about 30 and 60 weight percent of said monomeric polyglycol monoester graft copolymerized on said N-vinyl-3-morpholinone polymer.

13. The composition of claim 10, wherein the graft copolymer is a methoxy-polyethylene glycol methacrylate in which the polyethylene glycol constituent has a molecular weight of about 600 upon poly-N-vinyl-3-morpholinone.

14. The composition of claim 10, wherein the graft copolymer is a methoxy-polyethylene glycol methacrylate in which the polyethylene glycol constituent has a molecular weight of about 900 upon poly-N-vinyl-3-morpholinone.

15. The composition of claim 10, wherein the acrylonitrile polymer is polyacrylonitrile and the N-vinyl-3-morpholinone polymer is poly-N-vinyl-3-morpholinone.

16. A filamentary shaped article comprised of the composition of claim 10.

17. A composition comprising a major proportion of at least about 80 weight percent, based on composition weight, of (A) a polymerized ethylenically unsaturated monomeric material containing at least about 80 percent by weight of polymerized acrylonitrile, and (B) a minor proportion of up to about 20 weight percent, based on the composition weight, of a graft copolymer of (a) between about 10 and 80 weight percent of a mixture of monomers consisting of (1) from about 10 to 90 mole percent of a monomeric polyglycol monoester of the formula:

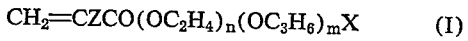

wherein Z is selected from the group consisting of hydrogen and methyl; X is selected from the group consisting of halogens of atomic number 17 to 35, alkoxy radicals containing 1 to 2 carbon radicals and alkyl sulfide radicals containing from 1 to 2 carbon atoms; $n$ is a number having an average value of from 5 to 100; and $m$ is a number that has an average value from 0 to 10; and (2) from about 90 to 10 mole percent of a monomeric alkenyl group-containing organic sulfonic acid compound selected from the group consisting of those having the formulae:

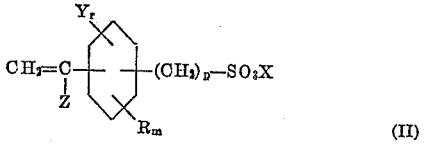

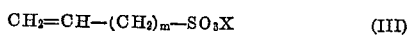

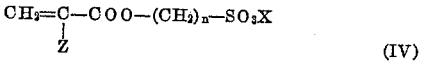

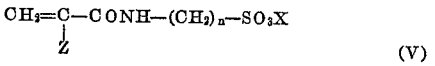

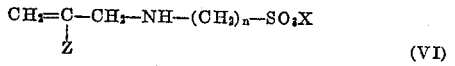

all where X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4; and (b) from about 90 to 20 weight percent of a polymerized monoethylenically unsaturated monomeric material containing at least about 10 weight percent of polymerized N-vinyl-3-morpholinone and up to about 90 weight percent of another polymerized N-vinyl-heterocyclic compound which compound is copolymerizable with N-vinyl-3-morpholinone.

18. The composition of claim 17, wherein the acrylonitrile polymer is polyacrylonitrile and the N-vinyl-3-morpholinone polymer is poly-N-vinyl-3-morpholinone.

19. A filamentary shaped article comprised of the composition of claim 17.

References Cited in the file of this patent
UNITED STATES PATENTS
2,861,101    Tousignant et al. _____ Nov. 18, 1958